US012811070B2

(12) United States Patent
Yoshida et al.

(10) Patent No.: US 12,811,070 B2
(45) Date of Patent: Nov. 24, 2026

(54) ELECTROLYTIC CAPACITOR

(71) Applicant: Nippon Chemi-Con Corporation, Tokyo (JP)

(72) Inventors: Atsushi Yoshida, Fukushima (JP); Makoto Tominaga, Fukushima (JP); Kazuhiro Nagahara, Tokyo (JP); Kazuya Koseki, Kanagawa (JP); Tatsuru Hatae, Kanagawa (JP)

(73) Assignee: Nippon Chemi-Con Corporation, Tokyo (JP)

( * ) Notice: Subject to any disclaimer, the term of this patent is extended or adjusted under 35 U.S.C. 154(b) by 382 days.

(21) Appl. No.: 18/400,579

(22) Filed: Dec. 29, 2023

(65) Prior Publication Data

US 2024/0170226 A1 May 23, 2024

Related U.S. Application Data

(63) Continuation of application No. 17/764,180, filed as application No. PCT/JP2020/046933 on Dec. 16, 2020, now abandoned.

(30) Foreign Application Priority Data

Dec. 18, 2019 (JP) ................................ 2019-228355

(51) Int. Cl.
*H01G 9/055* (2006.01)
*H01G 9/00* (2006.01)
*H01G 9/035* (2006.01)
*H01G 9/042* (2006.01)

(52) U.S. Cl.
CPC ........... *H01G 9/055* (2013.01); *H01G 9/0029* (2013.01); *H01G 9/035* (2013.01); *H01G 9/0425* (2013.01)

(58) Field of Classification Search
CPC ...... H01G 9/055; H01G 9/0029; H01G 9/035; H01G 9/0425; H01G 9/145; H01G 9/045; H01G 9/151; H01G 9/048
See application file for complete search history.

(56) References Cited

U.S. PATENT DOCUMENTS

| | | | | |
|---|---|---|---|---|
| 6,426,864 | B1 | 7/2002 | O'Phelan et al. | |
| 2002/0097550 | A1* | 7/2002 | Shimada | H01G 9/15 361/532 |
| 2011/0170229 | A1 | 7/2011 | Imamura et al. | |
| 2018/0047511 | A1 | 2/2018 | Tsuda | |
| 2021/0057166 | A1 | 2/2021 | Yoshida | |

FOREIGN PATENT DOCUMENTS

| | | | |
|---|---|---|---|
| CN | 106364791 | B | 12/2019 |
| EP | 2 680 286 | A1 | 1/2014 |
| JP | S55-021101 | A | 2/1980 |
| JP | H07-014640 | U | 3/1995 |
| JP | 2002-190428 | A | 7/2002 |
| JP | 2006-080111 | A | 3/2006 |
| JP | 2006-190878 | A | 7/2006 |
| JP | 2007-095865 | A | 4/2007 |
| JP | 2008-231512 | A | 10/2008 |
| JP | 4654637 | B2 | 3/2011 |
| JP | 2014-181368 | A | 9/2014 |
| JP | 2016-012667 | A | 1/2016 |
| JP | 2016-105497 | A | 6/2016 |
| JP | 2019-029455 | A | 2/2019 |
| WO | WO 2019/194092 | A1 | 10/2019 |

OTHER PUBLICATIONS

Office Action issued Jun. 12, 2024, in Chinese Patent Application No. 202080066557.9.
Office Action issued Apr. 23, 2024, in Japanese Patent Application No. JP2021-565617.
International Search Report from International Patent Application No. PCT/JP2020/046933, Mar. 16, 2021.
Office Action issued Jul. 19, 2022, for Japanese Patent Application No. 2021-565617.
Office Action issued Aug. 3, 2022, for Taiwanese Patent Application No. 109144498.
Office Action issued Feb. 7, 2023, for Japanese Patent Application No. 2021-565617.
Extended European Search Report issued Jul. 5, 2023, in European Patent Application No. 20902034.6.
Office Action issued Jan. 21, 2025, in Japanese Patent Application No. 2022-076045.
Office Action issued Jan. 4, 2025, in Chinese Patent Application No. 202080066557.9.
Office Action issued Dec. 5, 2023, in Taiwanese Patent Application No. 112124183.
Office Action issued Jun. 3, 2025, in Chinese Patent Application No. 202080066557.9.

* cited by examiner

*Primary Examiner* — Scott B Geyer
(74) *Attorney, Agent, or Firm* — Potomac Law Group, PLLC

(57) ABSTRACT

Provide is an electrolytic capacitor for a middle-to-high voltage application that is equal to or higher than 100 V which suppresses the total amount of gas to be produced in the electrolytic capacitor. The anode foil of the electrolytic capacitor includes an enlarged surface portion provided with tunnel-shape pits formed from the foil surface in the thickness direction of the foil, and a dielectric oxide film formed on the surface of the enlarged surface portion. The cathode body of the electrolytic capacitor includes a cathode foil formed of a valve acting metal, and a carbon layer formed on the cathode foil.

10 Claims, 3 Drawing Sheets

ELECTROLYTIC CAPACITOR

TECHNICAL FIELD

The present disclosure relates to an electrolytic capacitor.

BACKGROUND ART

An electrolytic capacitor is a passive element that accumulates and discharges electric charge by electrostatic capacitance. An electrolytic capacitor includes a capacitor component impregnated in an electrolytic solution and stored in an external casing that is sealed by a sealing member, and drawn terminals drawn from the sealing member. The capacitor component has an anode foil that is a valve acting metal foil on which a dielectric oxide film is formed, and a cathode foil formed of the same kind or the other kind of metal foil, has such anode foil and cathode foil facing with each other, and has a separator present between the anode foil and the cathode foil.

Some electrolytic capacitors need a withstand voltage that is equal to or higher than 100 V, such as for in-vehicle application like an electric vehicle or a power electronics application. The electrolytic capacitor that can withstand middle-to-high voltage that is equal to or higher than 100 V needs a thick dielectric oxide film. When, however, the dielectric oxide film becomes thick, the electrostatic capacitance decreases. Hence, the electrolytic capacitor for the middle-to-high voltage application that is equal to or higher than 100 V includes an enlarged surface layer provided with a large number of tunnel-shape pits in the anode foil. Moreover, the electrolytic capacitor includes an enlarged surface layer provided with tunnel-shape pits partially or entirely in the anode foil so as to pass completely therethrough. By such enlarged surface technology, the electrolytic capacitor for the middle-to-high voltage application that is equal to or higher than 100 V achieves the increase of the surface area of the anode foil while ensuring the thickness of the dielectric oxide film.

CITATION LIST

Patent Literatures

Patent Document 1: JP 2014-181368 A

SUMMARY OF INVENTION

Technical Problem

Meanwhile, gas is produced within an electrolytic capacitor by various phenomena. For example, at the anode side, when the dielectric oxide film is dissolved and the moisture of the electrolytic solution contacts the valve acting metal, hydrogen gas is produced by the hydration deterioration of the valve acting metal. Hydrogen gas is also produced at the cathode side on a foil interface. When the gas produced amount in the electrolytic capacitor increases, expansion of the external casing, valve opening or liquid leakage may occur.

In contrast, in recent years, the electrolytic capacitor for the middle-to-high voltage application that is equal to or higher than 100 V needs a further increase in the electrostatic capacitance. In other words, it is required to make the dielectric oxide film thin while maintaining a withstand voltage. When, however, the dielectric oxide film is made thin, this facilitates a contact of the valve acting metal with the moisture in the electrolytic solution, the reaction opportunities between the valve acting metal and thus the moisture in the electrolytic solution increases, and the amount of produced hydrogen gas increases.

Accordingly, a gas absorbent or a gas regulating agent like a nitro compound may be added to the electrolytic solution of the electrolytic capacitor. However, the nitro compound is likely to decrease the withstand voltage of the electrolytic capacitor, and it is desirable to reduce the addition amount for the electrolytic capacitor to which the middle-to-high voltage that is equal to or higher than 100 V is required.

The present disclosure has been made in order to address the aforementioned technical problems, and an objective is to provide an electrolytic capacitor for a middle-to-high voltage application that is equal to or higher than 100 V which suppresses the total amount of gas to be produced in the electrolytic capacitor.

Solution to Problem

First, a capacitance appearance rate will be defined. The capacitance appearance rate is a rate of an electrostatic capacitance of an electrolytic capacitor relative to an electrostatic capacitance at the anode side. That is, the capacitance appearance rate is a percentage in rate obtained by dividing a synthesis electrostatic capacitance with the electrolytic capacitor being regarded as a capacitor having an anode side and a cathode side connected in series by the electrostatic capacitance at the anode side. The synthesis electrostatic capacitance is obtained by dividing the multiplication result of the anode-side electrostatic capacitance and the cathode-side electrostatic capacitance by the total of the anode-side electrostatic capacitance and the cathode-side electrostatic capacitance. Hence, the capacitance appearance rate can be expressed by the following formula 1.

(Formula 1)

$$\text{Capacity Appearance Rate (\%)} = \frac{\text{Cathiode-Side Capacitance}}{\text{Anode-Side Capacitance} + \text{Cathode-Side Capacitance}} \times 100$$

As is expressed by formula 1, When the anode-side electrostatic capacitance is large, the effect at the cathode side on the capacitance appearance rate increases. Conversely, when the anode-side electrostatic capacitance is small, the effect at the cathode side on the capacitance appearance rate decreases.

In the technical field of electrolytic capacitor, the anode foil off an electrolytic capacitor or a so-called middle-to-high voltage application that is equal to or higher than 100 V has a smaller electrostatic capacitance per a unit area than that of the anode foil of an electrolytic capacitor for a low-voltage application. This is because, in the anode foil of an electrolytic capacitor for a middle-to-high voltage application, the dielectric oxide film of an enlarged surface layer becomes thick in order to ensure the withstand voltage. In view of the improvement of the capacitance appearance rate, for an electrolytic capacitor for a low-voltage application in which the electrostatic capacitance at the anode side is large, the effect of increasing the capacitance at the cathode side in order to increase the capacitance appearance rate is large. However, for an electrolytic capacitor for a middle-to-high voltage application in which the electrostatic capacitance at the anode side is small, even if the electrostatic capacitance at the cathode side is improved, the effect of the capacitance appearance rate is small.

When, for example, an anode foil that has an electrostatic capacitance which is 10 μF per 1 $cm^2$ is adopted for an electrolytic capacitor for a low-voltage application, the capacitance appearance rate when a cathode foil that has an electrostatic capacitance which is 100 μF per 1 $cm^2$ is adopted is 90.9%, and when the electrostatic capacitance of the cathode foil per 1 $cm^2$ is set to be 1000 μF, the electrostatic capacitance becomes 99.0%. Hence, the improvement of the capacitance appearance rate that is 109% is expected. In contrast, in the case of, for example, an anode foil that has an electrostatic capacitance which is 1 μF per 1 $cm^2$ is adopted for an electrolytic capacitor for a middle-to-high voltage application, the capacitance appearance rate when a cathode foil that has an electrostatic capacitance which is 100 μF per 1 $cm^2$ is adopted is 99.0%, but when the electrostatic capacitance of the cathode foil per 1 $cm^2$ is set to be 1000 μF, the electrostatic capacitance becomes 99.9%. Hence, the capacitance appearance rate hardly improves.

In the case of the electrolytic capacitor for a middle-to-high voltage application in which the effect of the capacitance appearance rate is small even if the electrostatic capacitance at the cathode side is improved, in view of, for example, the increase in the number of steps due to the application of a carbon material, it has not been attempted to improve the capacitance of the cathode foil so far. However, according to the keen researches by the inventors of the present disclosure, it becomes apparent that when, in an electrolytic capacitor for a middle-to-high voltage application that is equal to or higher than 100 V, a carbon layer is formed on a cathode foil, the total amount of produced gas in the electrolytic capacitor is suppressed.

The present disclosure has been made in view of such technical knowledges of the inventors of the present disclosure. An electrolytic capacitor according to the present disclosure includes an anode foil and a cathode body,

- in which the anode foil includes:
- an anode-side enlarged surface portion formed on a surface of the foil; and
- a dielectric oxide film formed on a surface of the enlarged surface portion, and
- in which the cathode body includes:
- a cathode foil formed of a valve acting metal; and
- a carbon layer formed on the cathode foil.

The anode-side enlarged surface portion may be provided with tunnel-shape pits formed from the surface of the foil in a thickness direction of the foil.

The cathode body may include a cathode-side enlarged surface portion formed on a surface of the cathode foil, and the carbon layer may be formed on the cathode-side enlarged surface portion.

The carbon layer and the cathode-side enlarged surface portion may be in contact with each other by pressing.

The carbon layer may enter the cathode-side enlarged surface portion.

The cathode-side enlarged surface portion may be provided with sponge-like pits, and a carbon material of the carbon layer may enter the sponge-like pits.

The above electrolytic capacitor may further include a component comprising the anode foil and the cathode body, and an electrolyte filled in the element,

- in which no nitro-based compound is contained in the electrolyte.

The cathode body may include an insulation layer formed on a surface of the foil, and the carbon layer may be formed on the insulation layer.

The insulation layer may be a natural oxide film or a chemical film.

The above electrolytic capacitor may further include a component including the anode foil and the cathode body, and an electrolyte which includes a solvent containing ethylene glycol and which is filled in the element.

Some of or all of the tunnel-shaped pits may pass completely through the anode foil.

The above electrolytic capacitor may be utilized for a middle-to-high voltage application that is equal to or higher than 100 V.

Advantageous Effects of Invention

According to the present disclosure, even in the case of an electrolytic capacitor for a middle-to-high voltage application that is equal to or higher than 100 V, the gas produced amount in the electrolytic capacitor can be suppressed.

DESCRIPTION OF EMBODIMENTS

Figure 1:
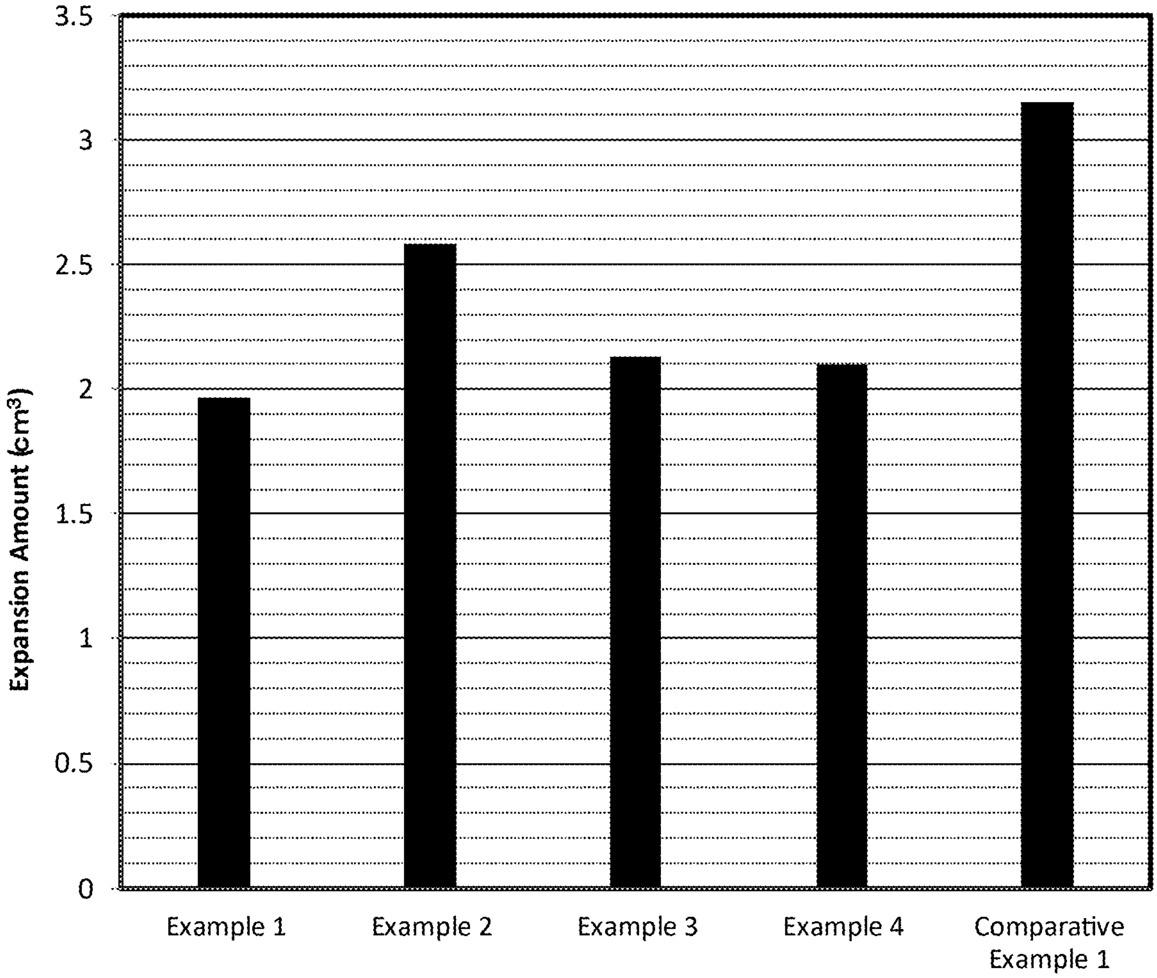
FIG. 1 is a graph illustrating respective expansion amounts of the laminate cells of electrolytic capacitors according to first to example 4s and a comparative example 1.

An electrode body according to an embodiment of the present disclosure and an electrolytic capacitor that utilizes the electrode body for a cathode will be described. According to this embodiment, although an electrolytic capacitor that includes an electrolytic solution will be described as an example, the present disclosure is not limited to this structure. The present disclosure is applicable to any electrolytic capacitor that utilizes a gel electrolyte as an electrolyte.

(Electrolytic Capacitor)

An electrolytic capacitor is a passive element that accumulates and discharges electric charge in accordance with an electrostatic capacitance. The electrolytic capacitor includes a wound type or a laminated-type capacitor component. The capacitor component has an anode foil that has a dielectric oxide film formed on a surface, and a cathode body. Those are caused to face with each other via a separator, and are impregnated in an electrolytic solution. The electrolytic solution is intimately in contact with the rough surface of the dielectric oxide film of the anode foil, and functions as a true cathode.

(Cathode Body)

The cathode body includes a cathode foil formed by an elongated valve acting metal as a current collector. A natural oxide film or a chemical film is formed on the surface of the cathode foil. An oxide film is formed naturally or intendedly. The natural oxide film is formed by the reaction of the cathode foil with oxygen in the air, and the chemical film is an oxide film that is intentionally formed by a chemical conversion process in which voltage is applied in solution without halogen ions such as aqueous solution of adipic acid, boric acid, or phosphoric acid. When a valve acting metal is an aluminum foil, the oxide film is aluminum oxide.

A carbon layer that contains a carbon material as a primary material is formed on the surface of the cathode foil. That is, the cathode body includes an oxide film that is an insulation layer formed on the cathode foil that is a current collector, and includes the carbon layer on the oxide film. Moreover, the carbon layer is located at the outermost surface of the cathode body. When the carbon layer is located at the outermost surface of the cathode body, the total amount of produced gas in the electrolytic capacitor is suppressed. Note that it is estimated that the gas produced amount at the cathode side is reduced, and thus the total amount of produced gas in the electrolytic capacitor is suppressed.

It is preferable that the carbon layer should be intimately in contact with the cathode foil and should not be easily separated from the cathode foil even if a shock is applied. When the carbon layer is not easily separated from the cathode foil, the total amount of produced gas in an electrolytic capacitor is further suppressed. In order to improve the intimate contact between the carbon layer and the cathode foil, it is preferable to form an enlarged surface layer on the surface of the cathode foil, and to form the carbon layer on the enlarged surface layer. Moreover, in order to improve the intimate contact between the carbon layer and the cathode foil, it is preferable to perform a pressing process to the cathode body formed on the cathode foil and to the carbon layer.

The cathode body will be described in detail. The valve acting metal that forms the cathode foil is aluminum, tantalum, niobium, titanium, hafnium, zirconium, zinc, tungsten, bismuth, or antimony, etc. Although the purity that is equal to or higher than 99% is desirable, impurities, such as silicon, iron, copper, magnesium, and zinc, may be contained. As for the cathode foil, for example, an aluminum material that has a temper designation of H defined by JIS standard H0001, i.e., a so-called H material, or an aluminum material that has a temper designation of O defined by JIS standard H0001, i.e., a so-called O material may be applied.

The enlarged surface layer is formed by electrolytic etching, chemical etching, or sandblasting, etc., or formed by vapor deposition or sintering of metallic particles on a foil body. An example electrolytic etching is an AC etching process. In the AC etching process, for example, a cathode foil is soaked in acidic aqueous solution without halogen ions, such as hydrochloric acid, and an AC current is applied. Moreover, in the chemical etching, a metallic foil is soaked in an acidic solution or an alkali solution. That is, the enlarged surface layer means a region where sponge-like etching pits are formed, or a region of a porous structure provided with voids formed by densified powders. Note that the etching pit may be a tunnel-shape pit formed by DC etching process, or a tunnel-shape pit that passes completely through the cathode foil.

The carbon material contained in the carbon layer is graphite, carbon black, or a mixture thereof. An example graphite is natural graphite, artificial graphite, or graphitization Ketjen black. An example carbon black is Ketjen black, acetylene black, channel black, or thermal black.

It is preferable that the carbon material contained in the carbon layer should be carbon black that is spherical carbon. When the enlarged surface layer formed on the surface of the cathode foil is etching pits, by applying carbon black that has a smaller particle diameter than the aperture diameter of each etching pit, it can easily enter the etching pit further deeply, and the carbon layer becomes intimately in contact with the cathode foil.

Moreover, the carbon material contained in the carbon layer may be graphite in a squam-piece shape or in a squam shape, and carbon black that is spherical carbon. It is preferable that the graphite in the squam-piece shape or in a squam shape should have an aspect ratio between short radius and a long radius that is within a range between 1:5 to 1:100. The carbon black that is spherical carbon preferably has a primary particle diameter that is equal to or smaller than 100 nm in average. When the carbon layer containing the carbon materials of such a combination is laminated on the cathode foil, the carbon black is easily rubbed in the pores of the enlarged surface layer by graphite. Graphite is easily deformed along the rough surface of the enlarged surface layer, and is easily piled up on the rough surface. Moreover, graphite becomes a depressing lid, and pushes and causes the spherical carbon rubbed in the pores to stay therein. Hence, the intimate contact of the carbon layer with the cathode foil and the fixability are further enhanced.

Furthermore, the carbon layer may contain activated carbon, carbon nanohorn, or fibrous carbon as the carbon material. Raw material of the activated carbon is natural plant tissue such as coconuts, synthetic resin such as phenol, or one derived from fossil fuel, such as coal, coke, or pitch. An example fibrous carbon is carbon nanotube (will be referred to as CNT below), or carbon nano fiber (will be referred to as CNF), etc. Since activated carbon and fibrous carbon have pi-electrons delocalized, and have a large specific surface area, those are preferable.

An example formation scheme of the carbon layer on the cathode foil is vacuum deposition, sputtering, ion plating, CVD, coating, electrolytic plating, or non-electrolytic plating, etc. When the coating is adopted, a carbon material is dispersed in a dispersing solvent to prepare a slurry, and the slurry is coated on the cathode foil by slurry casting, doctor blading, or spray atomization and is dried. When the vacuum deposition is adopted, a current is caused to flow through a carbon material and such a material is heated in a vacuum condition so as to be evaporated, or electron beams are emitted to the carbon material in a vacuum condition so as to be evaporated, and the film of the carbon material is formed on the cathode foil. Moreover, when sputtering is adopted, a target formed of a carbon material and a cathode foil are placed in a vacuum vessel, an inert gas is introduced in the vacuum vessel, and a voltage is applied so as to cause the inert gas that becomes plasma to collide the target, thereby depositing the particles of the carbon material beaten out from the target on the cathode foil.

After the carbon layer and the cathode foil are laminated, it is preferable to cause those components to be in contact with each other by a pressing process. In the pressing process, for example, the cathode body formed of the carbon layer and the cathode foil is held by press rollers so as to apply press-line pressure. A desirable press pressure is 0.01 to 100 $t/cm^2$. As far as the carbon layer and the cathode foil can be in contact with each other by pressing, there is no particular limitation for the press-contact structure produced at the interface of the cathode foil, but when a scheme is adopted in which the carbon material is pushed in the pores of the enlarged surface layer, and the carbon material is deformed along the rough surface of the enlarged surface layer by pressing, the intimate contact between the carbon layer and the cathode body and the fixability are further enhanced. In particular, carbon black that is spherical carbon is rubbed in the pores of the enlarged surface layer by graphite to which press pressure is applied, and the graphite is easily deformed along the rough surface of the enlarged surface layer and piled up.

Note that porous processes, such as activation process and aperture process, may be also performed on the carbon materials, such as graphite and carbon black. As for the porous process, conventionally well-known activation processes, such as a gas activation process and a drug activation process, can be applied. An example gas that is applied to the gas activation process is steam, air, carbon monoxide, carbon dioxide, hydrogen chloride, oxygen, or a gas that is a mixture thereof. Moreover, an example drug applied to the drug activation process is hydroxide of alkali metal, such as sodium hydroxide and potassium hydroxide, hydroxide of alkaline earth metal like calcium hydroxide, inorganic acid, such as boric acid, phosphoric acid, sulfuric acid, and hydrochloric acid, or inorganic salt like zinc chloride. When such an activation process is performed, heating process is performed as needed.

(Anode Foil)

The anode foil is an elongated foil formed of a valve acting metal. It is preferable that the purity regarding the anode foil should be equal to or higher than 99.9%. The anode foil is formed by forming an enlarged surface layer on an elongated foil, and by forming a dielectric oxide film on the surface of the enlarged surface layer. The enlarged surface layer is compatible with a middle-to-high voltage application that is equal to or higher than 100 V, and is provided with a large number of tunnel-shape pits engraved in the thickness direction from the foil surface by a DC etching process. In order to achieve a high capacity in the middle-to-high voltage application that is equal to or higher than 100 V, each tunnel-shape pit may be formed so as to pass completely through the anode foil. Alternatively, the enlarged surface layer may be formed by sintering the powders of a valve acting metal, or by vapor depositing the film of metal particle, etc., to form a film.

Typically, the dielectric oxide film formed on the anode foil is an oxidization film formed on the surface layer of the anode foil, and is an aluminum oxide layer obtained by oxidizing a porous structure region when the anode foil is formed of aluminum. The dielectric oxide film is formed by a chemical conversion process of applying voltage in in solution without halogen ions, such as acid like ammonium borate, ammonium phosphate, and ammonium adipate, or aqueous solution thereof.

(Electrolytic Solution)

It is preferable that the solvent of the electrolytic solution should be ethylene glycol. When ethylene glycol is utilized as a solvent, the withstand voltage of the electrolytic capacitor increases, thus suitable for the middle-to-high voltage application that is equal to or higher than 100 V. However, as far as the required withstand voltage is obtainable by an enlarged surface process and a chemical conversion process to the anode foil, the solvent may be any of a protonic polar solvent or an aprotic polar solvent. An example typical protonic polar solvent is monohydric alcohols, polyhydric alcohols, oxy-alcohol compounds, or water, etc. An example typical aprotic polar solvent is sulfone series, amide series, lactones, cyclic amide series, nitrile series, or oxide series, etc.

Example monohydric alcohols are ethanol, propanol, butanol, pentanol, hexanol, cyclobutanol, cyclopentanol, cyclohexanol, and benzyl alcohol, etc. Example polyhydric alcohols and oxy-alcohol compounds are ethylene glycol, propylene glycol, glycerol, methyl-cellosolve, ethyl-cellosolve, methoxy-propylene-glycol, and di-methoxy-propanol, etc. Example sulfone series are di-methyl-sulfone, ethyl-methyl-sulfone, diethyl-sulfone, sulpholane, 3-methyl-sulpholane, and 2,4-dimethyl-sulpholane, etc. Example amide series are N-methyl-formamide, N,N-dimethyl-formamide, N-ethyl-formamide, N,N-diethyl-formamide, N-methyl-acetamide, N,N-dimethyl-acetamide, N-ethyl-acetamide, N,N-diethyl-acetamide, and hexa-methylphosholic-amide, etc. Example lactones and cyclic amide series are γ-butyrolactone, γ-valerolactone, δ-valerolactone, N-methyl-2-pyrrolidone, ethylene-carbonate, propylene-carbonate, butylene-carbonate, and isobutylene-carbonate, etc. Example nitrile series are acetonitrile, 3-methoxy-propionitrile, and glutaronitrile, etc. An example oxide series is dimethyl-sulfoxide, etc. As the solvent, these may be utilized alone, or two or more kinds may be combined with each other.

The solute contained in the electrolytic solution contains anion and cation components, and is typically organic acid or salt thereof, inorganic acid or salt thereof, or a composite compound of organic acid, and inorganic acid, or salt thereof with an ion dissociability. Those can be utilized alone or two or more kinds of those may be combined with each other. Acid that becomes anion and base that becomes cation may be separately added to the electrolytic solution as solute components.

Example organic acids that become anion component in the electrolytic solution are oxalic acid, succinic acid, glutaric acid, pimelic acid, suberic acid, sebacic acid, phthalic acid, isophthalic acid, terephthalic acid, maleic acid, adipic acid, benzoic acid, toluic acid, enanthic acid, malonic acid, 1,6-decane-dicarboxylic acid, 1,7-octane-dicarboxylic acid, azelaic acid, carboxylic acid, such as undecane-dioic acid, dodecane-dioic acid, and tridecane-dioic acid, phenols, and sulfonic acid. Moreover, example inorganic acids are boric acid, phosphoric acid, phosphorous acid, hypophosphorous acid, carbonic acid, and filicic acid, etc. Example composite compounds of organic acid and inorganic acid are borodisalicylic acid, borodioxalic acid, and borodiglycolic acid, etc.

Furthermore, at least one example kind of salt of organic acid, inorganic acid, and a composite compound of organic acid and inorganic acid is ammonium salt, quaternized ammonium salt, quaternized amidinium salt, amine salt, sodium salt, and potassium salt, etc. Example quaternized ammonium ions of quaternized ammonium salt are tetra-methyl-ammonium, tri-ethyl-methyl-ammonium, and tetra-ethyl-ammonium, etc. Example quaternized amidinium are ethyl-dimethyl-imidazolinium, and tetra-methyl-imidazolinium, etc. Example amines of amine salt are primary amine, secondary amine, and tertiary amine. Example primary amines are methylamine, ethylamine, and propylamine, example secondary amines are dimethylamine, diethylamine, ethylmethylamine, and dibutylamine, and example tertiary amines are trimethylamine, triethylamine, tributyl amine, ethyldimethylamine, and ethyldiisopropylamine, etc.

Still further, other additives may be also added to the electrolytic solution. Such additives may contain phosphoric acid compounds, such as phosphoric acid and phosphate, boric acid, boric acid compounds, such as boric acid, and boric acid ester, a complex compound of boric acid and sugar alcohol, such as mannite and sorbitol, poly-oxy-alkylene-polyols, such as polyethylene glycol, polyglycerol, and polypropylene glycol, and colloidal silica, etc., and these improve the withstand voltage of the electrolytic capacitor.

Moreover, a nitro compound may be contained as the additive. Example nitro compounds are o-nitrobenzoic acid, m-nitrobenzoic acid, p-nitrobenzoic acid, o-nitrophenol, m-nitrophenol, p-nitrophenol, p-nitrobenzene, o-nitrophenol, m-nitrophenol, and p-nitrophenol, etc. The nitro compound has a hydrogen-gas absorption action. However, the nitro compound decreases the withstand voltage. Conversely, according to the electrolytic capacitor, by forming the carbon layer on the cathode foil, the total amount of produced gas in the electrolytic capacitor is suppressed. Accordingly, in order to cope with the middle-to-high voltage application that is equal to or higher than 100 V, it is preferable to reduce the added amount of the nitro compound as much as possible, and it is more preferable to contain no such compound.

(Separator)

The separator is present between the anode foil and the cathode foil so as to avoid a short-circuit between the anode foil and the cathode body, and holds the electrolytic solution. Example separators are cellulose, such as craft, manila hemp, rayon, and mixture paper thereof, polyester-based resin, such as polyethylene terephthalate, polybutylene terephthalate, and polyethylene-naphthalate, and the derivative thereof, polytetrafluoroethylene-based resin, polyvinylidene-fluoride-based resin, vinylon-based resin, polyamide-based resin, such as aliphatic polyamide, semi-aromatic polyamide, and wholly-aromatic polyamide, polyimide-based resin, polyethylene resin, polypropylene resin, trimethyl-pentene resin, polyphenylene sulfide resin, and acrylate resin, etc., and those resins may be applied in solo or may be mixed, and can be mixed with cellulose. Note that when the electrolyte has shape retaining characteristics and the electrolytic thickness is maintainable, the separator may be eliminated.

EXAMPLES

The present disclosure will be described further in detail with reference to examples below. Note that the present disclosure is not limited to the following examples.

First to Example 4s

Example 1

An electrolytic capacitor according to an example 1 was created. Aluminum foil was adopted as a cathode foil. An AC etching process was performed on the aluminum foil, and an enlarged surface layer that included sponge-like etching pits was formed on both surfaces of the foil. In the AC etching process, a cathode foil was soaked in an acidic aqueous solution that had an electrolyte which was mainly hydrochloric acid of substantially 8 wt % with a solution temperature of 25° C., and an AC current of 10 Hz and a current density of 0.14 $A/cm^2$ was applied to the base material for five minutes or so, and surface enlargement was performed on both surfaces of the aluminum foil.

Next, a chemical conversion process was performed on the aluminum foil, and an oxide film was formed on the surface of the enlarged surface layer. In the chemical conversion process, after chlorine sticking at the time of the AC etching process was removed by a phosphoric acid aqueous solution, and a voltage was applied within the solution of ammonium dihydrogenphosphate.

First, the carbon layer of the cathode body was caused to contain graphite and carbon black as the carbon material. The carbon layer was caused to contain the graphite (G) and the carbon black (C) at the ratio by weight of G:C=75:25. More specifically, powders of the graphite, powders of the carbon black, a binder that was styrene-butadiene rubber (SBR), and a dispersant containing aqueous solution that was carboxy-methyl-cellulose-sodium (CMC-Na) solution were mixed and kneaded to form a slurry.

The slurry was uniformly applied to the cathode foil. Subsequently, after heating and drying the slurry to cause the solvent to be volatilized, a pressing process was performed on the cathode body. In the pressing process, the cathode body was held between press rollers, a press-line pressure of 5.38 $kNcm^{-1}$ was applied so as to cause the carbon layer to be fixed on the cathode foil. The press-line pressure was applied using a pressing machine available from TAKUMI Engineering, Co., Ltd. The diameter of the press roller was 180 mm, and the pressing process width was 130 mm. The cathode body was once conveyed at 3 m/min.

Moreover, an aluminum foil was adopted as the anode foil. A DC etching process was performed on the aluminum foil, and the enlarged surface layer that included tunnel-shape etching pits was formed. In the DC etching process, a first step of forming pits and a second step of enlarging each pit were performed, and in the first step, etching was electrochemically performed on the aluminum foil by a DC current in an aqueous solution containing chlorine ions. The etching in the first step was performed for substantially one minute at a current density of 400 $mA/cm^2$. In the second step, in order to enlarge the pits formed in the aluminum foil having undergone the first step, etching was electrochemically performed by a DC current in a solution containing nitrate ions. The etching in the second step was performed for substantially two minutes at a current density of 300 $mA/cm^2$.

After the enlarged surface layer was formed, chemical conversion process to form a dielectric oxide film on the enlarged surface layer was performed on the anode foil. More specifically, a voltage of 286 V was applied in a chemical conversion solution of 4-wt % boric acid at the solution temperature of 85° C.

Drawn terminals of respective aluminum tabs were connected to the anode foil and the cathode body by ultrasonic. Next, zigzag-folded separator was prepared and the cathode body and the anode foil were held at each folded portion so as to cause the cathode body and the anode foil to face with each other with the separator being present therebetween, and thus a laminated body including the cathode body, the anode foil and the separator was created. A craft-based separator was adopted as the separator.

An electrolytic solution was impregnated in the laminated body. Regarding the electrolytic solution, ethylene glycol was added as a solvent and azelaic acid salt was added as a solute. No nitro compound was added in the electrolytic solution. After the electrolytic solution was impregnated, the laminated body was sealed by a laminate material. Accordingly, an electrolytic capacitor with a laminate cell was created. The laminate material formed of aluminum with a thickness of 110 μm was adopted. After the laminate cell was created, an aging process was performed. Regarding the aging process, a voltage of 230 V was applied to the laminate cell for 120 minutes at a room temperature (25° C.), and subsequently, the voltage of 230 V was applied for 60 minutes under a temperature environment of 85° C.

Example 2

An electrolytic capacitor according to an example 2 was created. According to the electrolytic capacitor of the example 2, no AC etching process was performed on the cathode foil, and no enlarged surface layer was formed on the cathode foil. In addition, the electrolytic capacitor of the example 2 was created by the same scheme and the same condition as those of the example 1 including the composition of the carbon layer formed on the cathode foil, the pressing process to the cathode body, and the non-addition of a nitro compound.

Example 3

An electrolytic capacitor according to an example 3 was created. According to the electrolytic capacitor of the third embodiment, no pressing process was performed in the step of forming the carbon layer on the cathode foil. In addition, the electrolytic capacitor of the example 3 was created by the same scheme and the same scheme as those of the example 1 including the formation of the enlarged surface layer by an AC etching process to the cathode foil, the composition of the carbon layer formed on the cathode foil, and the non-addition of a nitro compound.

Example 4

An electrolytic capacitor according to an example 4 was created. According to the electrolytic capacitor of the example 4, a cathode body on which a carbon layer was formed by sputtering was applied. An enlarged surface layer is formed on the cathode foil, and an oxide film that was a natural oxide film was formed. In the step of forming a carbon layer, no pressing process was performed. In addition, the electrolytic capacitor of the example 4 was created by the same scheme and the same condition as those of the example 1 including the formation of the enlarged surface layer by an AC etching process to the cathode foil and the non-addition of a nitro compound.

Comparative Example 1

An electrolytic capacitor according to a comparative example 1 was created. In the electrolytic capacitor of the comparative example 1, although an enlarged surface layer was formed on a cathode foil, no carbon layer was formed. In addition, the electrolytic capacitor of the comparative example 1 was created by the same scheme and the same condition as those of the example 1 including the non-addition of a nitro compound.

(Gas Produced Amount Measuring Test)

Respective gas produced amounts of the electrolytic capacitors according to the example 1 to the example 4, and the comparative example 1 were measured. A DC voltage of 219 V was continuously applied to each electrolytic capacitor under a temperature environment of 105° C., and the gas produced amount after 392 hours was measured. The gas produced amount was measured with reference to the expansion amount of the laminate cell. The expansion amount of the laminate cell was measured by Archimedes' method. That is, by measuring the weight increase when the laminate cell was immersed in water, the volume of a liquid expelled by the laminate cell was measured.

The measuring results of the gas produced amounts are shown in table 1 below. In table 1 below, the differences in the cathode body according to the example 1 to the example 4 and to the comparative example 1 are also indicated. Moreover, a graph that is FIG. 1 is created based on table 1. FIG. 1 is a graph illustrating respective expansion amounts according to the example 1 to the example 4 and to the comparative example 1.

TABLE 1

| | Cathode Body | | | | Electrolyte Solution | | Expansion Amount |
|---|---|---|---|---|---|---|---|
| | Carbon Layer | Formation Method of Carbon Layer | Enlarged Surface | Pressing | Nitro Compound | Solvent | After 392 Hours ($cm^3$) |
| Example 1 | Graphite:CB = | Slurry Application | Present | Present | Absent | Ethylene | 1.97 |
| Example 2 | 75:25 | | Absent | Present | | Glycol | 2.58 |
| Example 3 | | | Present | Absent | | | 2.13 |
| Example 4 | Present | Sputtering Film Formation | Present | Absent | | | 2.10 |
| Comparative Example 1 | Absent | — | Present | Absent | | | 3.15 |

As indicated by table 1 above and FIG. 1, although the expansion amount of the electrolytic capacitor of the comparative example 1 exceeded 3 $cm^3$, the expansion amounts of the electrolytic capacitor according to the example 1 to the example 4 were 2.5 $cm^3$ at the maximum. As indicated by table 1, the comparative example 1 had no carbon layer laminated on the cathode foil, but the example 1 to the example 4 had a carbon layer laminated on the cathode foil. Accordingly, it becomes clear that when a carbon layer is laminated on a cathode foil, the total amount of produced gas in the electrolytic capacitor is suppressed.

Moreover, as indicated by table 1 above and FIG. 1, although the expansion amount of the electrolytic capacitor of the example 2 was around 2.5 $cm^3$, the expansion amounts of the electrolytic capacitor according to the first, third and example 4s were 2.1 $cm^3$ at the maximum. As indicated by table 1, the example 2 had no enlarged surface layer on the cathode foil, but the first, third and example 4s had the enlarged surface layer formed on the cathode foil. Accordingly, it becomes clear that when an enlarged surface layer and a carbon layer are formed on a cathode foil, the total amount of produced gas in the electrolytic capacitor is further suppressed.

Furthermore, as indicated by table 1 above and FIG. 1, the expansion amount of the electrolytic capacitor of the example 1 was below 2 $cm^3$. As indicated by table 1, the third and example 4s had a pressing process eliminated when the carbon layer was formed on the cathode foil, but the example 1 had pressing process when the carbon layer was formed on the cathode foil. Accordingly, it becomes clear that when an enlarged surface layer and a carbon layer are formed on a cathode foil and a pressing process is added while forming the carbon layer, the total amount of produced gas in the electrolytic capacitor is further suppressed.

Fifth to Example 13s

Example 5

An electrolytic capacitor according to an example 5 was created. The electrolytic capacitor of the example 5 was created by the same scheme and the same condition as those of the example 1 except the voltage of a chemical conversion process and the voltage of an aging. In the example 5, the voltage at the time of the chemical conversion process for an anode foil was increased in comparison with that of the example 1, and the voltage of 534 V was applied to perform the chemical conversion process. Moreover, in the example 5, the voltage at the time of aging was increased in comparison with that of the example 1, the voltage of 450 V was applied to the laminate cell for 120 minutes at a room temperature, and subsequently, the voltage of 425 V was applied for 60 minutes under the temperature environment of 85° C.

Example 6

An electrolytic capacitor according to an example 6 was created. The electrolytic capacitor of the example 6 was created by the same scheme and the same condition as those of the example 2 except the voltage of a chemical conversion process for an anode foil, and the voltage of an aging. The voltage of the chemical conversion process for the anode foil and the voltage of the aging were the same as those of the example 5.

Example 7

The electrolytic capacitor according to an example 7 was created. The electrolytic capacitor of the example 7 was created by the same scheme and the same condition as those of the example 3 except the voltage of a chemical conversion process for an anode foil and the voltage of an aging. The voltage of the chemical conversion process for the anode foil and the voltage of the aging were the same as those of the example 5.

Example 8

An electrolytic capacitor according to an example 8 was created. According to the electrolytic capacitor of the example 8, no AC etching process was performed on a cathode foil, and no enlarged surface layer was formed on the cathode foil. Moreover, no pressing process was performed at the time of forming a carbon layer on a cathode foil. In addition, the electrolytic capacitor of the example 8 was created by the same scheme and the same condition as those of the example 1 including the composition of the carbon layer formed on the cathode foil and the non-addition of a nitro compound. However, the voltage of a chemical conversion process for the anode foil and the voltage of an aging were the same as those of the example 5.

Example 9

An electrolytic capacitor according to an example 9 was created. A carbon material that was carbon black only was contained in the carbon layer of the electrolytic capacitor of the example 9. More specifically, powders of carbon black, a binder that was styrene-butadiene rubber (SBR), and a dispersant containing aqueous solution that was a carboxymethyl-cellulose-sodium (CMC-Na) solution were mixed and kneaded to form a slurry. In addition, the electrolytic capacitor of the example 9 was created by the same scheme and the same condition as those of the example 1 including the formation of the enlarged surface layer by an AC etching process to the cathode foil, the pressing process to the cathode body, and the non-addition of a nitro compound. However, the voltage of a chemical conversion process for the anode foil and the voltage of an aging were the same as those of the example 5.

Example 10

An electrolytic capacitor according to an example 10 was created. According to the electrolytic capacitor of the example 10, no pressing process was performed at the time of forming a carbon layer on the cathode foil. In addition, the electrolytic capacitor of the example 10 was created by the same scheme and the same condition as those of the example 9 including the formation of the enlarged surface layer by an AC etching process to the cathode foil, the composition of the carbon layer formed on the cathode foil, and the non-addition of a nitro compound. The voltage of a chemical conversion process for the anode foil and the voltage of an aging were the same as those of the example 5.

Example 11

An electrolytic capacitor according to an example 11 was created. According to the electrolytic capacitor of the example 11, no AC etching process was performed on the cathode foil, and no enlarged surface layer was formed on the cathode foil. Moreover, no pressing process was performed at the time of forming the carbon layer on the cathode foil. In addition, the electrolytic capacitor of the example 11 was created by the same scheme and the same condition as those of the example 9 including the composition of the carbon layer formed on the cathode foil and the non-addition of a nitro compound. However, the voltage of a chemical conversion process for the anode foil and the voltage of an aging were the same as those of the example 5.

Example 12

An electrolytic capacitor according to an example 12 was created. The electrolytic capacitor of the example 12 was created by the same scheme and the same condition as those of the example 4 except the voltage of a chemical conversion process and the voltage of an aging. The voltage of the chemical conversion process for the anode foil and the voltage of the aging were the same as those of the example 5.

Example 13

An electrolytic capacitor according to an example 13 was created. According to the electrolytic capacitor of the example 13, no AC etching process was performed on the cathode foil and no enlarged surface layer was formed on the cathode foil. Moreover, no pressing process was performed at the time of forming the carbon layer on the cathode foil. In addition, the electrolytic capacitor of the example 13 was created by the same scheme and the same condition as those of the example 12 including the non-addition of a nitro compound. The voltage of a chemical conversion process for the anode foil and the voltage of an aging were the same as those of the example 5.

Comparative Example 2

An electrolytic capacitor according to a comparative example 2 was created. The electrolytic capacitor of the comparative example 2 was created by the same scheme and the same condition as those of the comparative example 1 except the voltage of a chemical conversion process, and the voltage of an aging. The voltage of the chemical conversion process for the anode foil and the voltage of the aging were the same as those of the example 5.

(Gas Produced Amount Measuring Test)

Respective gas produced amounts of the electrolytic capacitors according to the example 5 to the example 13 and the comparative example 2 were measured. The measuring scheme and the measuring condition of the gas produced amount were the same as those of the example 1 to the example 4 and the comparative example 1 except the applied voltage and the measuring timing of the expansion amount. That is, for the electrolytic capacitors according to the example 5 to the example 13 and the comparative example 2, a DC voltage of 409 V was continuously applied under a temperature environment of 105° C., and the gas produced amount after 232 hours was measured.

Figure 2:
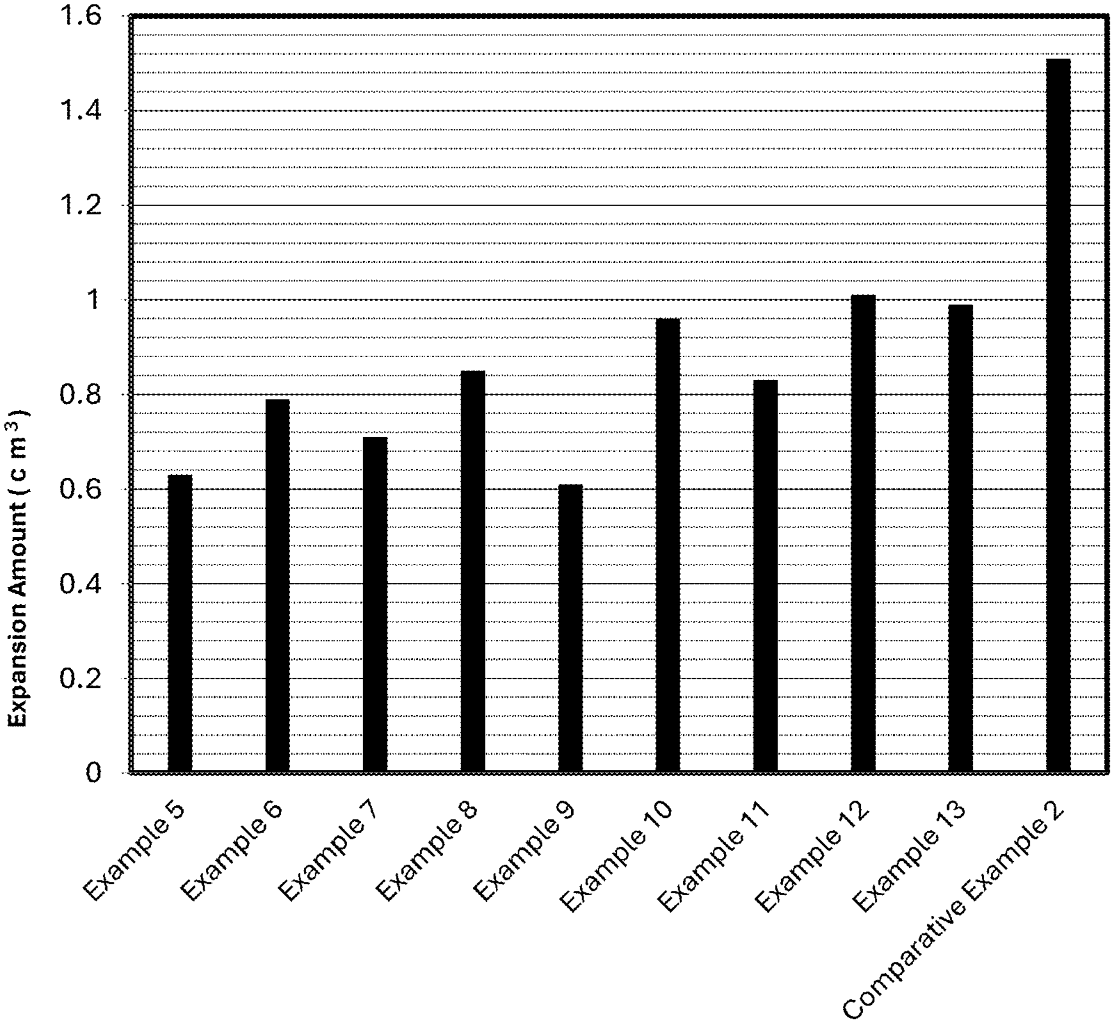
FIG. 2 is a graph illustrating respective expansion amounts of the laminate cells of electrolytic capacitors according to fifth to example 13s and a comparative example 2.

The measurement results of the respective gas produced amounts are shown in table 2 below. Three samples were prepared for each example and each comparative example, and the average value of the three samples was taken as a measurement result. In table 2 below, the differences in the cathode body according to the example 5 to the example 13 and the comparative example 2 are also indicated. Moreover, a graph that is FIG. 2 was created based on table 2. FIG. 2 is a graph illustrating the respective expansion amounts according to the example 5 to the example 13 and the comparative example 2.

comparison with the example 8 having not undergone a pressing process and in which no enlarged surface layer was formed. Furthermore, according to the example 5 having undergone a pressing process and in which the enlarged surface layer was formed, the expansion result is proper in comparison with any of the example 6 to the example 8. Furthermore, the electrolytic capacitors according to the example 9 to the example 11 that employed a structure in which only carbon black as the carbon material was contained in the carbon layer will be compared. According to the example 9 having undergone a pressing process, the expansion amount is suppressed in comparison with the example 10 and the example 11 both having not undergone a pressing process.

Hence, it becomes clear that according to the example 5 to the example 13 and the comparative example 2, when an enlarged surface layer and a carbon layer are formed on a cathode foil, or when a pressing process is performed after the carbon layer is formed on the cathode foil, there is a tendency such that the total amount of produced gas in the electrolytic capacitor is further suppressed.

Moreover, when the example 7 and the example 10 that have a difference only in the structure of the carbon layer are compared with each other in table 2 above and FIG. 2, the expansion amount is further suppressed in the example 7 in which graphite is mixed in the carbon layer. That is, it becomes clear that, when graphite is selected as a carbon material to be contained in the carbon layer in addition to

TABLE 2

| | Cathode Body | | | | Electrolyte Solution | | Expansion Amount |
|---|---|---|---|---|---|---|---|
| | Carbon Layer | Formation Method of Carbon Layer | Enlarged Surface | Pressing | Nitro Compound | Solvent | After 392 Hours ($cm^3$) |
| Example 5 | Graphite:CB = 75:25 | Slurry Application | Present | Present | Absent | Ethylene Glycol | 0.63 |
| Example 6 | | | Absent | Present | | | 0.79 |
| Example 7 | | | Present | Absent | | | 0.71 |
| Example 8 | | | Absent | Absent | | | 0.85 |
| Example 9 | Graphite:CB = 0:100 | | Present | Present | | | 0.61 |
| Example 10 | | | Present | Absent | | | 0.96 |
| Example 11 | | | Absent | Absent | | | 0.83 |
| Example 12 | Present | Sputtering Film Formation | Present | Absent | | | 1.01 |
| Example 13 | Present | | Absent | Absent | | | 0.99 |
| Comparative Example 2 | Absent | — | Present | Absent | | | 1.51 |

As indicated by table 2 above and FIG. 2, although the expansion amount of the electrolytic capacitor of the comparative example 2 exceeded 1.5 $cm^3$, the expansion amounts of the electrolytic capacitors according to the example 5 to the example 13 were 1.01 $cm^3$ at the maximum. As indicated by table 2, although the comparative example 2 had no carbon layer laminated on the cathode foil, the example 5 to the example 13 had a carbon layer laminated on the cathode foil. Accordingly, it becomes clear from the results of the example 5 to the example 13 and the comparative example 2 that when a carbon layer is laminated on a cathode foil, the total amount of produced gas in the electrolytic capacitor is suppressed.

The electrolytic capacitors according to the example 5 to the example 8 that had the carbon layer with the same structure will be compared in table 2 above and FIG. 2. According to the example 6 having undergone a pressing process, the expansion amount is suppressed in comparison with the example 8 having not undergone a pressing process in which no enlarged surface layer was formed. According to the example 7, the expansion amount is suppressed in carbon black, the total amount of produced gas in the electrolytic capacitor is further suppressed.

Example 14

Furthermore, an electrolytic capacitor according to an example 14 was created. According to the example 1, although the capacitor component was sealed in the laminate material, according to the electrolytic capacitor of the example 14, such a component was inserted in an aluminum-made external casing, and was sealed by an opening sealing body. An external casing is a cylinder with a bottom and in a cylindrical shape with a thickness of a side face that is 0.4 mm. The condition of a chemical conversion process for the anode foil differs from that of the example 1, and according to the example 14, a voltage of 650 V was applied in a chemical conversion solution of 4-wt % of boric acid at a solution temperature of 85° C. Moreover, the condition of an aging process differs from that of the example 1, and according to the example 14, a voltage of 481 V was applied for 95 minutes at a room temperature (30° C.). In addition, the electrolytic capacitor of the example 14 was created by the same scheme and the same condition as those of the example 1 including the composition of the carbon layer formed on the cathode foil, the pressing process to the cathode body, and the non-addition of a nitro compound.

15th Example

An electrolytic capacitor according to a 15th example was created. The electrolytic capacitor of the 15th example had a difference in the presence or absence of a nitro compound in an electrolytic solution in comparison with the electrolytic capacitor of the example 14. According to the electrolytic capacitor of the 15th example, para-nitro-benzyl alcohol was added as a nitro compound in the electrolytic solution. The added amount of the nitro compound was 2 wt %. In addition, the electrolytic capacitor of the 15th example was created by the same scheme and the same condition as those of the example 14 including the composition of the carbon layer formed on the cathode foil and pressing process to the cathode body.

Comparative Example 3

An electrolytic capacitor according to a comparative example 3 was created. According to the electrolytic capacitor of the comparative example 3, no carbon layer was formed on the cathode body. In addition, the electrolytic capacitor of the comparative example 3 was created by the same scheme and the same condition as those of the example 13 including the non-addition of a nitro compound.

Comparative Example 4

An electrolytic capacitor according to a comparative example 4 was created. According to the electrolytic capacitor of the comparative example 4, no carbon layer was formed on the cathode body. According to the electrolytic capacitor of the comparative example 4, however, para-nitro-benzyl alcohol was added as a nitro compound in the electrolytic solution. The added amount of the nitro compound was 2 wt %. In addition, the electrolytic capacitor of the comparative example 4 was created by the same scheme and the same condition as those of the comparative example 3.

(Gas Produced Amount Measuring Test)

Respective gas produced amounts of the electrolytic capacitors according to the example 14 and 15th example and the third and comparative example 4s were measured. A DC voltage of 450 V was continuously applied to each electrolytic capacitor under a temperature environment of 105° C., and the gas produced amount at each time point until 3000 hours had lapsed was measured. Regarding the gas produced amount, the maximum expanded part of the external casing was taken as a measuring point, and the change amount in radius at the measuring point was visually measured.

Figure 3:
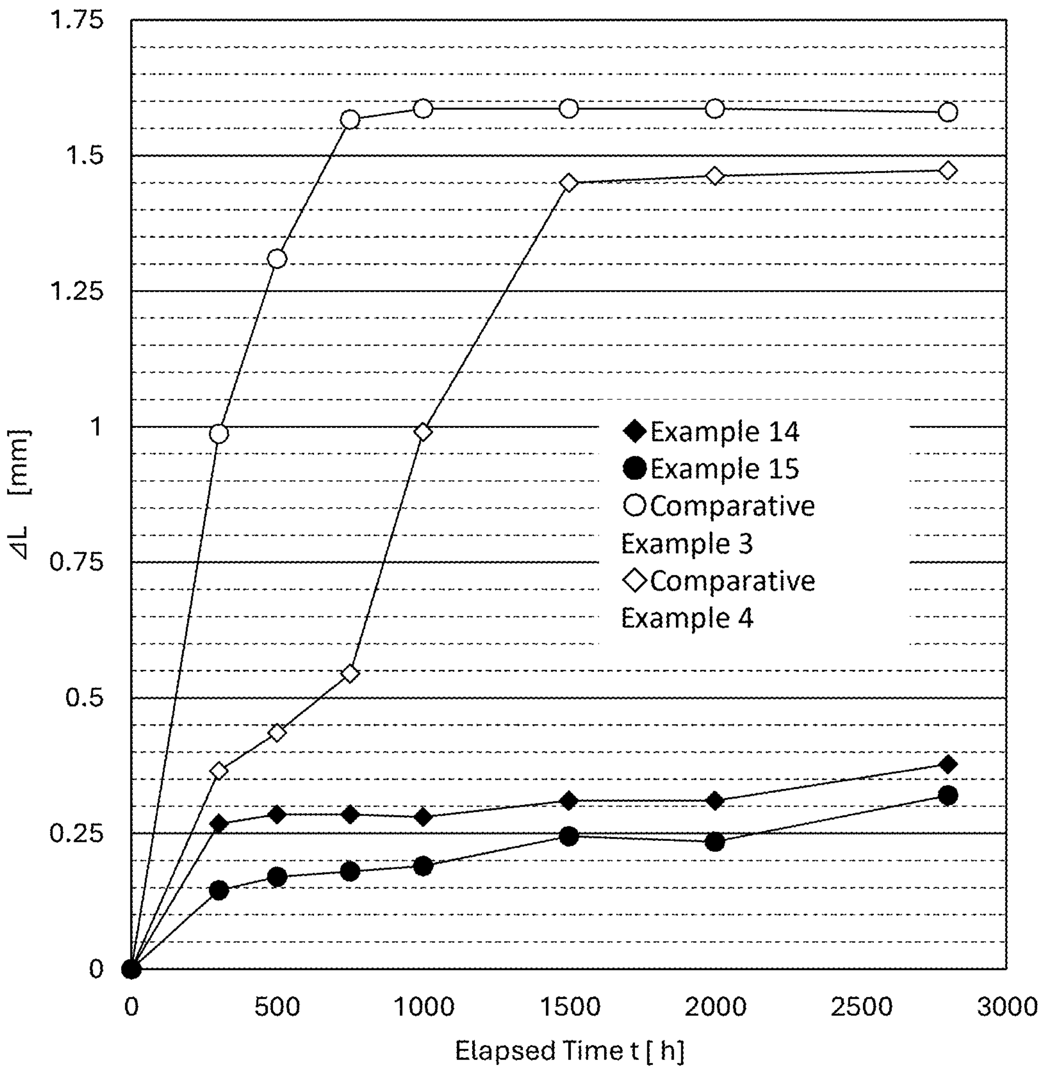
FIG. 3 is a graph illustrating respective expansion amounts of the external casings of electrolytic capacitors according to 14th and 15th example and third and comparative example 4s.

The measuring results of the gas produced amounts are shown in FIG. 3. In FIG. 3, a black diamond symbol indicates the example 14, a black circular symbol indicates the 15th example, a white circular symbol indicates the comparative example 3, and a white diamond symbol indicates the comparative example 4. FIG. 3 is a graph illustrating the expansion amount of the external casing relative to an elapsed time with a horizontal axis representing the elapsed time and a vertical axis representing the expansion amounts of the example 14 and the 15th example and the third and comparative example 4s. Note that the differences of the cathode body among the example 14 and the 15th example and the third and comparative example 4s are summarized in table 3 below. As shown in table 3, the differences of the third and comparative example 4s relative to the example 14 and the 15th example are the presence or absence of the carbon layer, and the difference between the example 14 and the 15th example is the presence or absence of an added nitro compound.

TABLE 3

| | Cathode Body | | | | Electrolyte Solution | | Expansion Amount |
|---|---|---|---|---|---|---|---|
| | Carbon Layer | Formation Method of Carbon Layer | Enlarged Surface | Pressing | Nitro Compound | Solvent | After 392 Hours ($cm^3$) |
| Example 14 | Graphite:CB = 75:25 | Slurry Application | Present | Present | Present | Ethylene Glycol | 1.97 |
| Example 25 | | | Absent | | | | 2.58 |
| Comparative Example 3 | Absent | — | Present | | | | 2.13 |
| Comparative Example 4 | Absent | | Present | | | | 2.10 |

As shown in table 3 and FIG. 3, according to the comparative example 4 that had the nitro compound added to the electrolytic solution, a time until the expansion amount reached 1.5 mm that was the expansion limit of the external casing was slow in comparison with the comparative example 3 that had no nitro compound added. That is, it becomes clear that the nitro compound suppresses the gas produced amount. According to the electrolytic capacitor of the comparative example 4, however, after 1500 hours had elapsed, the expansion amount reached the expansion limit of the external casing. In contrast, as shown in table 3 and FIG. 3, according to the example 14 and the 15th example that had the carbon layer formed on, together with a pressing process, the cathode foil that included the enlarged surface layer, the expansion of the external casing was suppressed, and the expansion amount did not reach the limit.

Moreover, as is clear from the comparison between the example 14 and the 15th example, the degree of the expansion of the external casing did not change in accordance with the presence or absence of the nitro compound. The electrolytic capacitor of the example 5 had no nitro compound added to the electrolytic solution, and the electrolytic capacitor of the 15th example had the nitro compound added to the electrolytic solution. That is, it becomes clear that since the total amount of produced gas in the electrolytic capacitor is suppressed when the carbon layer is laminated on the electrode foil, it is unnecessary to contain the nitro compound that is a gas absorbent. Hence, the withstand voltage of the electrolytic capacitor can be also improved.

The invention claimed is:

1. A manufacturing method of an electrolytic capacitor, comprising:
- a step of enlarging a surface of an anode foil;
- a step of forming dielectric oxide film on the enlarged surface of the anode foil;
- a step of enlarging a surface of a cathode foil;
- a step of forming a carbon layer on the enlarged surface of the cathode foil; and
- a step of pressure-welding the cathode foil and the carbon layer,
- wherein in the step of pressure-welding, the carbon layer enters into the enlarged surface of the cathode foil.

2. The manufacturing method according to claim 1, further comprising a step of forming an insulation layer on the surface of the cathode foil, between the step of enlarging the surface of the cathode foil and the step of forming the carbon layer.

3. The manufacturing method according to claim 1, further comprising:
- a step of forming an element by combining the anode foil and the cathode foil on which the carbon layer is formed, and
- a step of filling an electrolyte including a solvent containing ethylene glycol in the element.

4. A manufacturing method of an electrolytic capacitor, comprising:
- a step of enlarging a surface of an anode foil;
- a step of forming dielectric oxide film on the enlarged surface of the anode foil;
- a step of enlarging a surface of a cathode foil;
- a step of forming a carbon layer on the enlarged surface of the cathode foil; and
- a step of pressure-welding the cathode foil and the carbon layer,
- wherein:
- in the step of enlarging the surface of the cathode foil, sponge-like pits are formed in the surface of the cathode foil, and
- in the step of pressure-welding, carbon material of the carbon layer enters the sponge-like pits.

5. The manufacturing method according to claim 4, further comprising a step of forming an insulation layer on the surface of the cathode foil, between the step of enlarging the surface of the cathode foil and the step of forming the carbon layer.

6. The manufacturing method according to claim 5, further comprising:
- a step of forming an element by combining the anode foil and the cathode foil on which the carbon layer is formed, and
- a step of filling an electrolyte including a solvent containing ethylene glycol in the element.

7. The manufacturing method according to claim 4, further comprising:
- a step of forming an element by combining the anode foil and the cathode foil on which the carbon layer is formed, and
- a step of filling an electrolyte including a solvent containing ethylene glycol in the element.

8. A manufacturing method of an electrolytic capacitor, comprising:
- a step of enlarging a surface of an anode foil;
- a step of forming dielectric oxide film on the enlarged surface of the anode foil;
- a step of enlarging a surface of a cathode foil;
- a step of forming a carbon layer on the enlarged surface of the cathode foil; and
- a step of pressure-welding the cathode foil and the carbon layer,
- wherein the method further comprises a step of forming an insulation layer on the surface of the cathode foil, between the step of enlarging the surface of the cathode foil and the step of forming the carbon layer.

9. The manufacturing method according to claim 8, further comprising:
- a step of forming an element by combining the anode foil and the cathode foil on which the carbon layer is formed, and
- a step of filling an electrolyte including a solvent containing ethylene glycol in the element.

10. A manufacturing method of an electrolytic capacitor, comprising:
- a step of enlarging a surface of an anode foil;
- a step of forming dielectric oxide film on the enlarged surface of the anode foil;
- a step of enlarging a surface of a cathode foil;
- a step of forming a carbon layer on the enlarged surface of the cathode foil;
- a step of pressure-welding the cathode foil and the carbon layer;
- a step of forming an element by combining the anode foil and the cathode foil on which the carbon layer is formed; and
- a step of filling an electrolyte including a solvent containing ethylene glycol in the element.

* * * * *